E. M. & T. H. STILES.
RIND REMOVING ATTACHMENT FOR MEAT SLICING MACHINES.
APPLICATION FILED JAN. 19, 1910.
1,028,796.
Patented June 4, 1912.
2 SHEETS—SHEET 2.
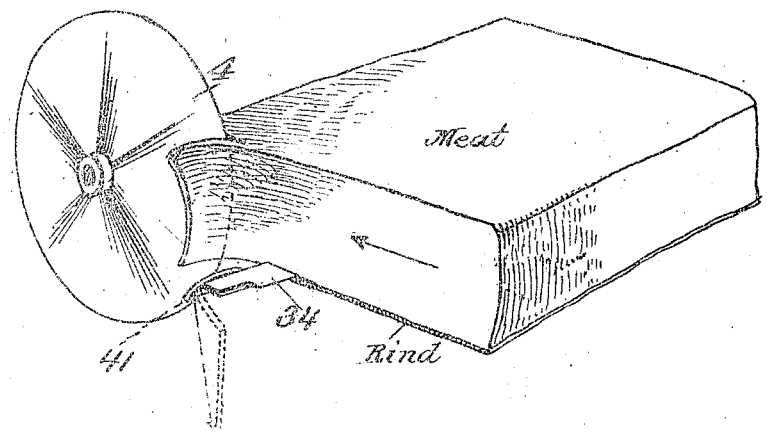
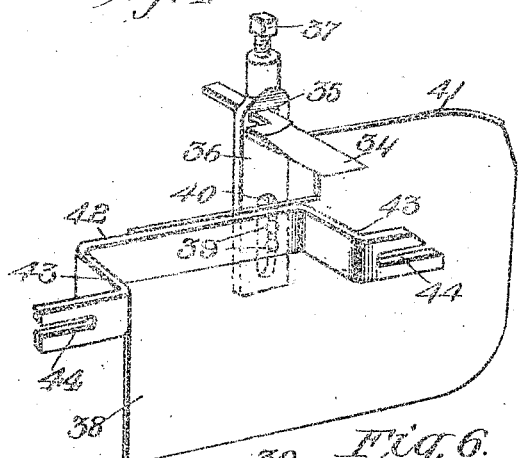
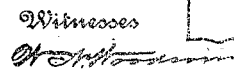

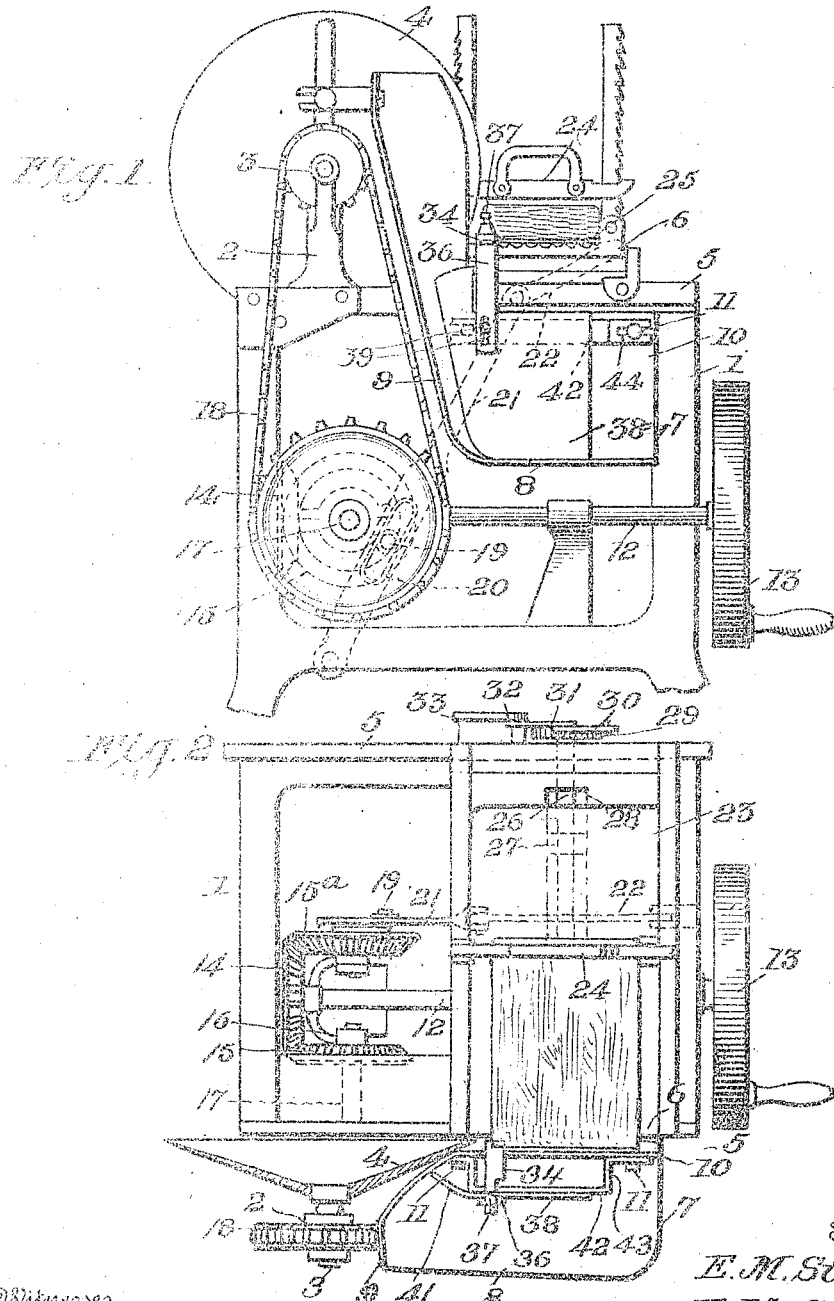

UNITED STATES PATENT OFFICE.

EDWARD M. STILES AND THOMAS H. STILES, OF MOUNT PLEASANT, IOWA.

RIND-REMOVING ATTACHMENT FOR MEAT-SLICING MACHINES.

1,028,796.   Specification of Letters Patent.   Patented June 4, 1912.

Application filed January 19, 1910. Serial No. 538,889.

*To all whom it may concern:*

Be it known that we, EDWARD M. STILES and THOMAS H. STILES, citizens of the United States, both residing at Mount Pleasant, in the county of Henry and State of Iowa, have invented certain new and useful Improvements in Rind-Removing Attachments for Meat-Slicing Machines, of which the following is a specification.

It is well-known that in the ordinary form of meat slicing machines, bacon, or like meat goods, is sliced with the rind attached thereto, and it therefore becomes necessary to subsequently remove the rind from the slices by hand, this being manifestly undesirable, since it consumes considerable time and frequently results in a waste of bacon.

The object of the present invention is an improved device whereby the rind is positively and automatically severed from the bacon during the operation of the machine and simultaneously with the cutting of each slice, and being adjustable to remove merely the thickness of the rind, whereby to reduce the proportion of waste to a minimum and also adjustable out of operative position at will.

A further object of the invention is a device of this character which includes means for separating the slices of rind from the slices of meat which is obviously a desideratum.

A still further object of the invention is a device which is susceptible of attachment to the ordinary form of meat slicing machines, which embodies to a marked degree the characteristics of simplicity and durability, and which is not likely to get out of order and may be easily kept in repair.

With these and other objects in view, as will more fully appear as the description proceeds, the invention consists in the features of novelty, in substantially the construction, arrangement and combinations of the parts hereinafter more fully described and claimed.

For a full understanding of the invention, reference is to be had to the following description and accompanying drawings in which—

Figure 1 is a front elevation of a meat slicing machine equipped with the improvements of the invention. Fig. 2 is a top plan view thereof, partly shown in section. Fig. 3 is a fragmentary perspective view illustrating the operation of the knives. Fig. 4 is a detail perspective view of the attachment forming the subject-matter of this invention. Fig. 5 is a fragmentary longitudinal section showing a slice partially cut off, and Fig. 6 is a fragmentary rear elevation of the machine showing part of the feed mechanism.

Corresponding and like parts are referred to in the following description and indicated in all the views of the drawings by the same reference characters.

The present invention is particularly designed for, though not necessarily limited in its use, in connection with a meat slicing machine of the type such as is disclosed in the patent to Van Berkel, No. 628,742, dated July 11, 1899.

The slicing machine herein referred to comprises a main supporting frame 1 at the front of which is disposed a standard 2 in which is journaled a shaft 3, that carries a relatively stationary, but revoluble circular slicing blade 4, the slicing blade being preferably dished, as shown. The supporting frame has transversely extending guides 5 to which the carrier or table 6 is connected so as to be susceptible of reciprocating laterally with respect to the blade 4. The bacon, or like meat to be operated upon is secured on the carrier with its forward end projecting slightly beyond the forward edge of the carrier in order to be engaged by the slicing blade 4 when the carrier moves laterally toward the same.

An open collecting receptacle 7 is disposed at the front of the frame 1 to receive the slices which are thrown forwardly by virtue of the dished formation of the slicing blade. The receptacle consists, in the present instance, of a bottom 8, a side 9, arranged in proximity to the standard 2, and a back 10. The back 10 abuts against the front of the supporting frame 1 and is attached thereto at transversely spaced points by means of screws 11, or other suitable fastening devices.

The operating mechanism may be of any suitable construction, and in the present instance, for the purpose of illustration, it is shown as comprising a main shaft 12 journaled in the supporting frame with one end projecting therebeyond and provided with a crank-wheel 13, by means of which the shaft is rotated. At its other end the shaft is provided with a bevel pinion 14 which meshes at substantially diametrically opposite points with two bevel gears 15 and 15ª which are mounted in a bearing support 16, and are disposed at substantially right angles to the pinion 14. The bevel gear 15 effects the rotation of the slicing blade 4, and for this purpose is fixed on a countershaft 17 that is connected directly to the shaft 3, through the medium of the chain gearing 18. The other bevel gear 15ª has a pin 19 outstanding eccentrically therefrom and operating in a slot 20 formed in a lever 21 which is fulcrumed on the main frame 1, the lever being connected to the carrier 6 by a link 22. The lever is oscillated by the pin upon the rotation of the gear 15ª, and such motion is transmitted to the carrier by the link 22, whereby to effect the reciprocation of the carrier simultaneously with the rotation of the slicing blade 4.

A plate 23 is mounted to slide longitudinally upon the carrier 6 and is provided with a clamp 24, by means of which the meat is secured thereto, the forward portion of the carrier being corrugated as indicated at 25, so as to engage with the forward end portion of the meat to maintain the same against lateral displacement when the plate 23 is positioned at the rear of the carrier.
The plate 23 forms a part of the feeding mechanism, and is advanced the thickness of one slice each time the carrier is retracted away from the slicing blade. This is accomplished by means of a threaded rod 26 that is journaled beneath the carrier 6, and is engaged by a nut 27 depending from the plate 23 and operating in a slot 28 extending longitudinally of the carrier. A ratchet wheel 29 is fixed on the threaded rod and is engaged by a pawl 30 connected to one arm of an elbow lever 31 fulcrumed on the rod 26. The other arm of the elbow lever carries a roller 32 arranged to ride on a cam member 33 secured to the main frame 1.
When the carrier moves to cause the meat to be acted upon by the slicing blade, the pawl 30 slips over the teeth of the ratchet wheel and hence does not turn the threaded rod. However, upon the retraction of the carrier the pawl engages with the ratchet wheel whereby to turn the threaded rod and thus move the plate 23 forwardly the requisite amount.

As hereinbefore premised, the present invention resides more specifically in an attachment which may be applied to the ordinary meat slicing machine just described. This attachment consists of a substantially flat double-edged knife-blade 34 which is disposed horizontally and longitudinally at the front of the main frame 1 and lies in a plane slightly above the top surface of the carrier to project over the edge of the carrier, the rear end of the knife terminating in substantially vertical alinement with the front edge of the carrier and with the plane of its cutting edge intersecting the plane of the cutting edge of the blade 4. The knife 34 is preferably arranged in proximity to the slicing blade 4 so as to engage the meat before it is operated upon by the latter. At its forward end the knife blade is preferably reduced and mounted in an opening 35 in the upper end of an upright support 36, the knife being detachably and adjustably held in the opening by means of a set-screw 37. The support 36 in the present exemplification of the invention projects upwardly above the upper edge of a transverse dividing plate 38, and is secured at its lower end to the front face thereof by attaching screws 39, the attaching screws passing through a vertical slot 40 in the support, in order to render the same vertically adjustable to move the blade 34 toward and away from the face of the support 6. The dividing plate rests upon the bottom 8 of the collecting receptacle and extends laterally on both sides of the support 36, the plate being extended upwardly upon the side of the support adjacent to the slicing blade, and such extended portion being inclined rearwardly to constitute a deflector 41.

The attaching screws 39 project rearwardly through the dividing plate and serve to secure the same to an attaching bracket 42 that abuts against the rear face thereof. This attaching bracket is preferably in the form of a transverse bar, the end portions of which are offset rearwardly as indicated at 43, and abuts against the back 10 of the collecting receptacle to maintain the dividing plate in spaced relation thereto so that such plate serves as a partition to form front and rear compartments in the receptacle 7. The offset ends 43 of the bracket are preferably formed with horizontal slots 44 that are designed to have the respective screws 11 passed therethrough to removably and adjustably fasten the attachment to the slicing machine and by means of which the blade 34 may be adjusted in the direction of the relative movement of the support 6 and the cutter 4.

In practice, the bacon for instance is secured upon the carrier with the rind down. As the carrier moves laterally toward the slicing blade 4, the rind severing blade 34, in the present exemplification of the invention, will sever the rind from the meat preparatory to making a slice, by the engagement of the meat with the blade 4. After the carrier has moved forwardly to its limit and the slice cut, the return lateral movement of the carrier will be accompanied by a slight feeding of the meat on the carriage in the direction of the blade 34 and as the meat nears the limit of its travels in the return movement of the carriage, the blade 34 enters the meat at the juncture of the latter with the rind and is so positioned that it will remain in the meat even when the carriage has been fully brought back in its lateral movement to its initial position, this being due to the fact that the blade 34 is relatively broad, as will be best seen in Fig. 2. This is done to make it certain that the stationary knife 34 cannot pass under the rind and bacon. This operation is repeated indefinitely so long as necessary to form the number of slices required.

When the meat is carried against the blade 4, the projecting portion thereof is sliced off, and the strip of rind which is sliced off will curl up inasmuch as it has been previously severed from the meat, the strip of rind falling into the collecting receptacle behind the dividing plate 38. The slice of meat, however, is thrown forwardly by the dish formation of the blade 4 and is received in the collecting receptacle in front of the dividing plate. The deflector 41 assists in deflecting the slice of meat forwardly in front of the dividing plate so as to positively insure that the slice of meat and rind shall be kept separate from each other.

Having thus described the invention, what is claimed as new is:

1. In a machine of the character described, the combination with a relatively movable meat support, and a slicing knife extended beyond the upper surface of said support, of means for removing the outer layer from each slice of the meat separately.

2. In a machine of the character described, the combination with a relatively movable meat support, and a slicing knife extending beyond the upper surface of said support, of a relatively stationary severing knife arranged above the upper surface of said support, and arranged to remove the outer layer from each slice of the meat separately.

3. In a machine of the character described, the combination with a relatively movable meat support, and a slicing knife extending beyond the upper surface of said support, of a vertically adjustable severing knife extending over and above the upper surface of said support and arranged to remove the outer layer from each slice of the meat separately.

4. In a meat slicing machine, the combination of a slicing blade, a meat carrier, a support on which the carrier is mounted for movement toward and away from the slicing blade, and a rind severing knife arranged in the path of movement of only a portion of the meat as it is fed toward and away from the knife.

5. In a machine of the character described, the combination with a relatively movable meat support, and a slicing knife extending beyond the upper surface of said support, of a vertically and horizontally adjustable severing knife extending over the upper surface of said support for removing the outer layer of each slice of the meat separately.

6. In a meat slicing machine, the combination of a relatively stationary slicing blade, a meat carrier, means for feeding the meat forwardly with respect to the carrier, means for reciprocating the carrier transversely with respect to the slicing blade, whereby to slice off the portion of the meat that is fed forwardly, and means for severing the rind from said portion of the meat preparatory to the cutting of the slice.

7. In a meat slicing machine, the combination of a relatively stationary slicing blade, a meat carrier, means for feeding the meat forwardly with respect to the carrier, means for reciprocating the carrier transversely with respect to the slicing blade, whereby to slice off the portion of the meat that is fed forwardly, and a relatively stationary knife blade positioned in the path of the meat and in advance of the cutting edge of the slicing blade and arranged to sever the rind from the portion of the meat to be sliced off, preparatory to the cutting of the slice.

8. In a meat slicing machine, the combination of a relatively stationary slicing blade, a meat carrier, means for reciprocating the carrier transversely with respect to the slicing blade to cut off the slice, means for feeding the meat forwardly in the carrier, the thickness of a slice each time the carrier is retracted, and a relatively stationary double edged knife blade positioned in the path of the meat and in advance of the cutting edge of the slicing blade and arranged to sever the rind from the meat preparatory to the cutting of each slice.

9. In a meat slicing machine, the combination with a slicing blade and a meat carrier reciprocating across the blade, of a stationary separating knife mounted on one side of the blade and located in the path of reciprocation of the meat, and means for permitting the knife to be adjusted in the direction of said reciprocation.

10. In a machine of the character described, the combination with a relatively movable support and slicing means extending beyond the upper surface of said support, of means acting simultaneously with the slicing means for removing the outer layer from only a slice cut from the article to be sliced and before the slice is cut.

11. In a machine of the character described, the combination with relatively movable support and slicing means extending beyond the upper surface of said support, of means for removing the outer layer from only a slice cut from the article to be sliced, the last said means being adjustable relatively to said slicing means.

12. In a machine of the character described, the combination with a support for the article to be sliced and a slicing knife, said support and knife being capable of relative movement, of a rind removing knife, the cutting plane of each knife intersecting that of the other knife.

13. In a machine of the character described, the combination with a support for the article to be sliced and a slicing knife, said support and knife being capable of relative movement, of a rind removing knife, the cutting plane of each knife intersecting that of the other knife, and adjustable means for supporting said rind removing knife.

14. In a machine of the character described, the combination of a meat support, a slicing knife, means for producing relative movement between the support and slicing knife, said knife being caused by such relative movement to project beyond the upper surface of said support, and a second knife extending longitudinally of the direction of relative movement between said support and slicing knife and overhanging said support to cut the outer layer of meat from each slice separately.

15. In a machine of the character described, the combination with a meat supporting table and a slicing knife, means for producing relative movement therebetween, said knife being disposed to cut entirely through the meat and rind at each slice, a second knife disposed to overhang the lateral edge of said table whereby it is adapted to remove an outside layer from each slice of the meat, and a support for the second knife adjustable toward and away from the slicing knife.

16. In a machine of the character described, the combination with a support for the article to be sliced and a slicing knife, there being relative movement between said support and knife, of a rind removing knife, and a support therefor, said rind removing knife being adjustable on its support into and out of the position in which it extends across the cutting plane of the first said knife.

17. In a machine for slicing meat, the combination with a slicing knife, of a table for moving the meat to said knife, a second knife, a support for the second knife having one edge contiguous to the lateral edge of the moving table and parallel to the direction of movement of said table, said second knife being adjustable on its support to overhang said table.

18. In a machine of the character described, the combination with a flat support for the article to be sliced and a slicing knife, said support and knife being capable of relative to and fro movement, of a rind removing knife movable into and out of the cutting plane of the first knife.

19. In a machine of the class described, the combination of a support for the article to be sliced and a slicing knife, said support and knife being capable of relative movement, a rind removing knife, the cutting plane of each knife intersecting the other knife, and means for supporting the rind removing knife for adjustment transversely with respect to the direction of relative movement of the support and slicing knife.

20. In a machine of the class described, the combination with a support for the article to be sliced and a slicing knife, said support and knife being capable of relative movement, of a rind removing knife, the cutting plane of each knife intersecting the other knife, and means for supporting said rind removing knife for adjustment both laterally and longitudinally.

21. In a machine of the class described, the combination with a support for the article to be sliced and a slicing knife, said support and knife being capable of relative movement, of a rind removing knife, a support for the rind removing knife, means for vertically adjusting said support, and means for securing the rind removing knife to the support for adjustment laterally with respect to the support.

22. In a machine of the class described, the combination with a support for the article to be sliced and a slicing knife, said support and knife being capable of relative movement, of a rind removing knife overhanging said support to cut the outer layer of meat from each slice separately, and means for adjusting said rind removing knife toward and away from the meat support in a vertical plane.

23. In a machine of the class described, the combination with a support for the article to be sliced and a slicing knife, said support and knife being capable of relative movement, of a rind removing knife overhanging said support to cut the outer layer of meat from each slice separately, and means for adjusting said rind removing knife toward and away from the meat support in a horizontal plane.

24. In a machine of the class described, the combination with a support for the article to be sliced and a slicing knife, said support and knife being capable of relative movement, of a rind removing knife overhanging said support to cut the outer layer of meat from each slice separately, and means for adjusting said rind removing knife toward and away from the meat support in both a horizontal and a vertical plane.

25. In a machine of the class described, the combination with a relatively movable meat support and a slicing knife extending beyond the upper surface of said support, of a relatively fixed severing knife arranged above the upper face of said support to intersect the plane of the cutting edge of the first recited knife, and also arranged to remove the outer layer from each slice of the meat separately.

26. In a machine of the class described, the combination with a relatively movable meat support and a slicing knife extending beyond the upper surface of said support, of a relatively fixed severing knife arranged above the upper face of said support to intersect the plane of the cutting edge of the first said knife, and also arranged to remove the outer layer from each slice of the meat separately, and means for adjusting said severing knife toward and away from the said upper face of the meat support.

27. In a machine of the class described, the combination with a relatively movable meat support and a slicing knife extending beyond the upper surface of said support, of a relatively fixed severing knife arranged above the upper face of said support to intersect the plane of the cutting edge of the first recited knife, and also arranged to remove the outer layer from each slice of the meat separately, means for adjusting said severing knife toward and away from the said upper face of the meat support, and means for also adjusting said severing knife away from the lateral edge of the meat support.

28. In a machine of the class described, the combination with a meat support and slicing knife, means for producing relative movement therebetween, said knife being disposed to cut entirely through the meat and rind at each slice, a second knife disposed adjacent the lateral edge of said support whereby it is adapted to remove an outer layer from each slice of meat, and means for supporting the second recited knife for adjustment toward and away from the said lateral edge.

29. In a machine of the class described, the combination with a meat support and slicing knife, means for producing relative movement therebetween, said knife being disposed to cut entirely through the meat and rind at each slice, a second knife disposed adjacent the lateral edge of said support whereby it is adapted to remove an outer layer from each slice of meat, and means for supporting the second recited knife for lateral adjustment toward and away from the surface of the meat support.

30. In a machine of the class described, the combination with a meat support and slicing knife, means for producing relative movement therebetween, said knife being disposed to cut entirely through the meat and rind at each slice, a second knife disposed adjacent the lateral edge of said support whereby it is adapted to remove an outer layer from each slice of meat, means for supporting the second recited knife for adjustment toward and away from the said lateral edge of the support and means for also supporting the last recited knife for adjustment toward and away from the surface of the meat support.

31. In a machine of the class described, the combination of a meat support and a slicing knife, means for producing relative movement between the support and slicing knife, and a rind removing knife, the cutting plane of each knife intersecting the other knife, the said rind removing knife being disposed to remove a portion of the rind before the meat is cut by the slicing knife.

32. In a machine of the class described, the combination with a meat support and a slicing knife, means for producing relative movement therebetween, said knife being disposed to cut entirely through the meat and rind at each slice, a second knife extending over and above the upper surface of said support, and means for varying the distance that the second recited knife projects over the surface of the meat support.

33. In a machine of the class described, the combination with a meat support and a slicing knife, means for producing relative movement therebetween, said knife being disposed to cut entirely through the meat and rind at each slice, a second knife extending over and above the upper surface of said support, means for varying the distance that the second recited knife projects over the surface of the meat support, and means for locking the second knife to its support with any desired amount of overhang.

34. In a machine of the class described, combination of a relatively movable meat support and slicing means extending beyond the upper surface of the support, of means for removing the outer layer from only a slice cut from the article to be sliced, the last said means being mounted for adjustment vertically with respect to the meat support, laterally with respect to said support and longitudinally with respect to the support, the last said adjustment being in the direction of said relative movement.

35. In a meat slicing machine, the combination with a slicing blade and a meat carrier reciprocating across the blade, a rind removing knife disposed with the plane of its cutting edge intersecting the plane of the cutting edge of the sliding blade, means for supporting said rind removing knife for adjustment in a direction of said reciprocation, means for supporting said rind removing knife for adjustment laterally with respect to the meat carrier and means whereby said rind removing knife may be adjusted vertically with respect to the plane of the supporting surface of the meat carrier.

36. In a machine of the class described, the combination with a relatively movable meat support, and a slicing knife extending beyond the upper surface of said support, of means for removing the outer layer from each slice of meat separately, and means for separating the severed slice and rind.

37. In a machine of the class described, the combination with a relatively movable meat support, and a slicing knife extending beyond the upper surface of said support, of means for removing the outer layer from each slice of meat separately, and means for separating the severed slice and rind, said means including a deflector.

38. In a machine of the class described, the combination with a relatively movable meat support, and a slicing knife extending beyond the upper surface of said support, of means for removing the outer layer from each slice of meat separately, a collecting receptacle for the slices and a plate positioned within the receptacle for separating the slices and rind.

39. In a machine of the class described, the combination with a relatively movable meat support, and a slicing knife extending beyond the upper surface of said support, of means for removing the outer layer from each slice of meat separately, a collecting receptacle, a plate to separate the slices of rind from the slices of meat and a deflector carried by the plate.

40. In a machine of the class described, the combination with a relatively movable meat support, and a slicing knife extending beyond the upper surface of said support, of means for removing the outer layer from each slice of meat separately, a collecting receptacle having separate compartments, the slices of rind being deposited in one compartment and the slices of meat being deflected by the slicing blade and deposited in the other compartment.

41. In a machine of the class described, the combination with a reciprocity table for supporting bacon, and a slicing knife projecting below the top of said table and adjacent the lateral edge thereof, a support for the rind removing knife adjacent the lateral edge of said table, a knife adjustably mounted on said support to move into and out of position to overhang the lateral edge of the table, and means for limiting the adjusting movement of the last said knife.

In testimony whereof we affix our signatures in presence of two witnesses.

EDWARD M. STILES. [L. S.]
THOMAS H. STILES. [L. S.]

Witnesses:
MARY I. STILES,
WILLIAM R. BUDDE.